Jan. 12, 1960 J. O. PREISIG 2,921,231

TELEVISION DEFLECTION CIRCUITS

Filed March 24, 1958 2 Sheets-Sheet 1

INVENTOR.
JOSEPH O. PREISIG
BY
W. H. Sprague
ATTORNEY

Jan. 12, 1960 J. O. PREISIG 2,921,231

TELEVISION DEFLECTION CIRCUITS

Filed March 24, 1958 2 Sheets-Sheet 2

INVENTOR.
JOSEPH O. PREISIG
BY
W. H. Sprague
ATTORNEY 2,921,231

TELEVISION DEFLECTION CIRCUITS

Joseph O. Preisig, Trenton, N.J., assignor to Radio Corporation of America, a corporation of Delaware Application March 24, 1958, Serial No. 723,254
11 Claims. (Cl. 315—27)

This invention relates to television deflection circuits and in particular to transistor horizontal deflection circuits for television receivers.

There is a certain amount of leakage inductance and distributed capacitance present in the high voltage transformer of television deflection circuits. In deflection circuits using switching transistors this leakage inductance and distributed capacitance is resonated to produce voltage and current transients. These transients, which are a harmonic frequency of the deflection frequency, appear on the kinescope raster as light intensity modulation and are undesirable. Prior art techniques for removing the undesired transients have generally involved the dissipation of the harmonic frequency energy. While these techniques are successful in eliminating the undesired harmonic frequency energy, they consume and are wasteful of energy. In a television receiver employing electron tubes the loss of energy can be tolerated since a considerable amount of energy is available. In a low power and portable transistor television receiver, however, the loss of as little as a fraction of a watt of power is a considerable percentage of the total available power and should be avoided if possible.

It is, accordingly, an object of this invention to provide an improved deflection system for transistor television receivers.

It is another object of this invention to substantially eliminate, without the consumption of power, the undesired harmonic transients in a transistor deflection system for television receivers.

A transistor deflection circuit embodying the invention includes a resonant circuit which is tuned to the frequency of undesired harmonic transients. The harmonic energy across the resonant circuit is used to supply the heater power for the high voltage rectifier of a television receiver. In this manner, the undesired harmonic transients are substantially eliminated from the deflection circuit of the receiver, while the harmonic energy is not dissipated, but utilized in a beneficial manner. Thus the undesired transients are eliminated without the wasteful consumption of power in the receiver.

Figure 1:
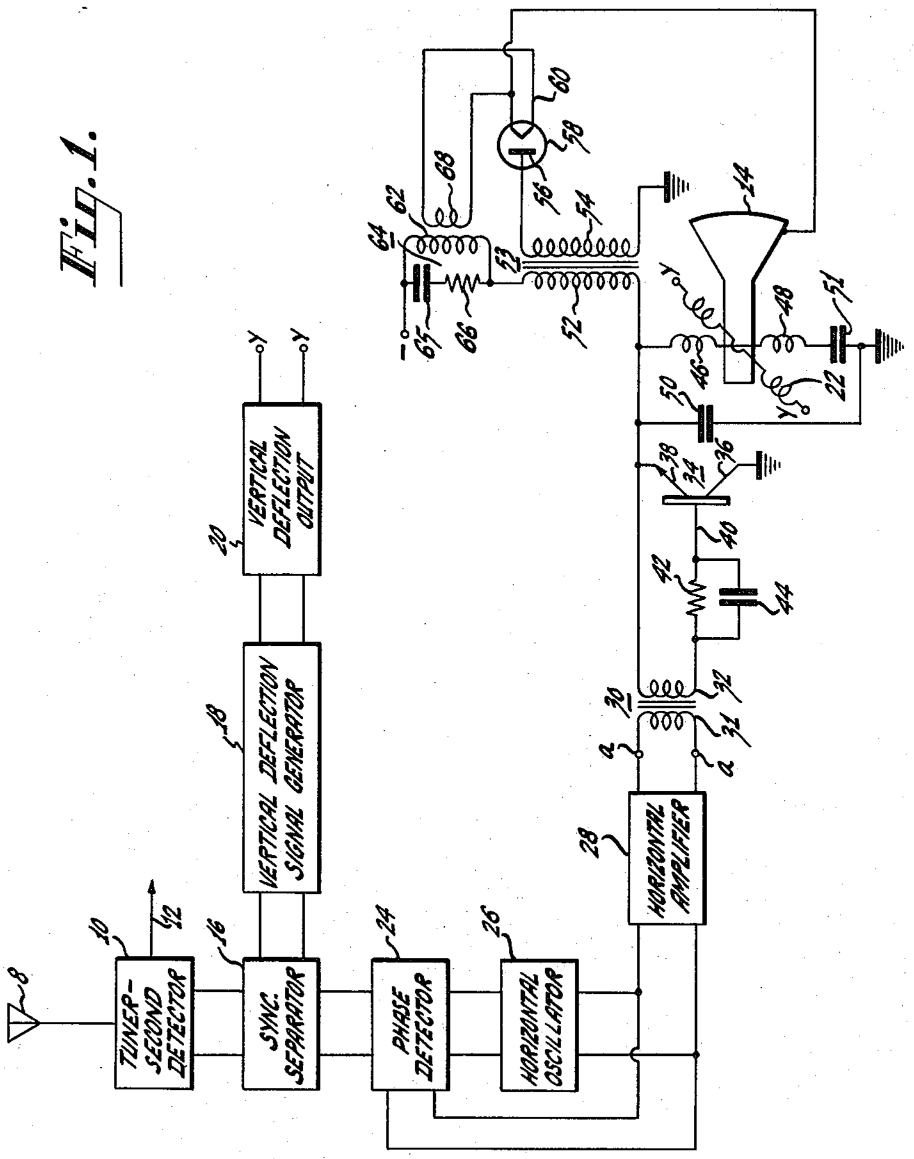
Figure 2:
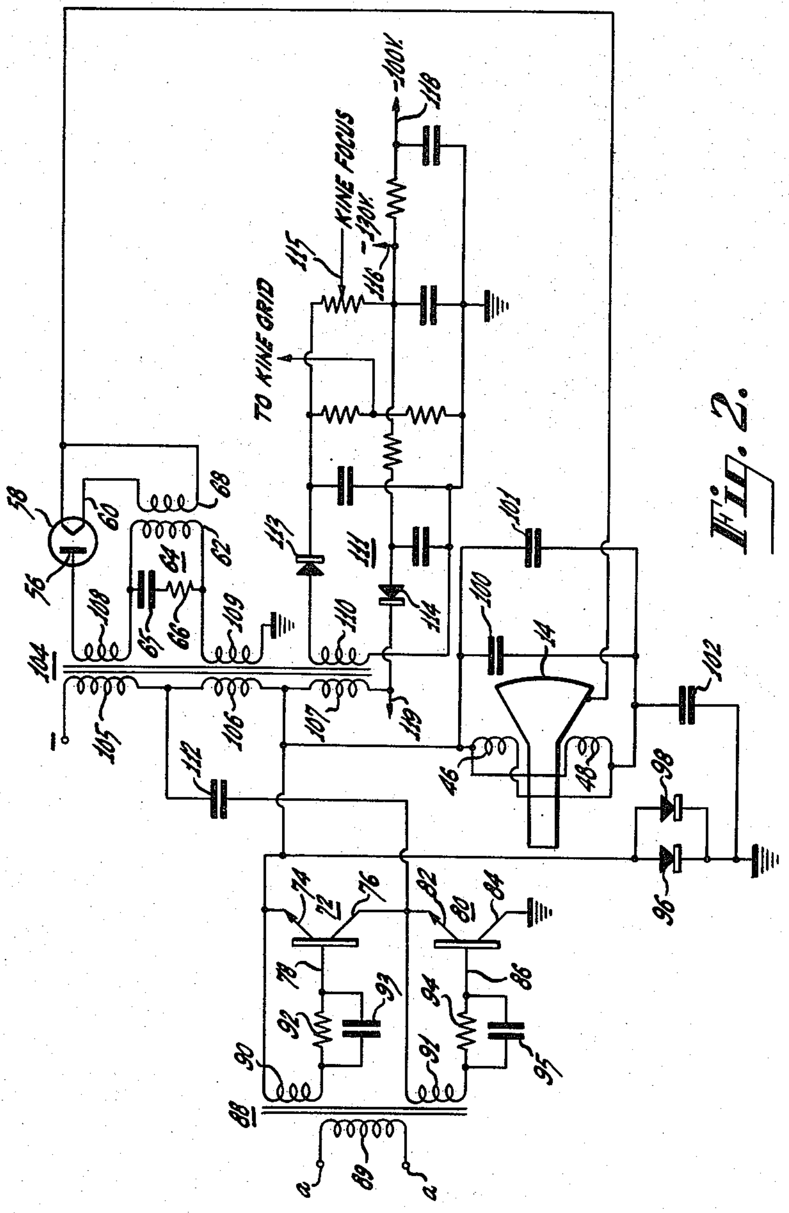

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a schematic circuit diagram, partially in block diagram form, of a television receiving system embodying the invention; and Figure 2 is a schematic circuit diagram of a transistor deflection circuit and high voltage supply circuit embodying the invention.

Referring now to the drawing, wherein like parts are indicated by like reference numerals in both figures, and referring in particular to Figure 1, a television receiver includes an antenna 8 which receives composite television signals and couples the received signals to a tuner-second detector 10. The tuner-second detector 10 would normally include, as is conventional, a radio frequency amplifier, a frequency converter for converting the radio frequency signals to intermediate frequency signals, an intermediate frequency amplifier, a detector for deriving the composite television signals from the intermediate frequency signals, and a video amplifier. The amplifier composite television signal is derived from an output lead 12 and conventionally applied to the control grid (not shown) of a television kinescope 14. The composite television signals are also applied to a sync separator circuit 16, which is connected with the tuner-second detector 10. The sync separator circuit 16 supplies vertical synchronizing pulses to a vertical deflection signal generator 18, which is connected with the sync separator circuit 16. The vertical signal generator 16 is, in turn, connected to a vertical deflection output circuit 20. The vertical deflection output circuit 20 includes a pair of output terminals Y—Y which are connected to the terminals of a vertical deflection yoke winding 22 of the kinescope 14.

Horizontal synchronzing pulses derived from the sync separator 16 are applied to a phase detector 24 which also is supplied with the signal generator by a horizontal oscillator 26. The error voltage developed in the phase detector 24 is applied to the horizontal oscillator 26 to synchronize it with the horizontal sync pulses. The horizontal oscillator signal generated by the horizontal oscillator 26 is amplified by a horizontal amplifier 28.

Amplified voltage pulses, which are derived from the horizontal amplifier 28, are applied through a transformer 30 to the base electrode 40 of a horizontal deflection output transistor 34. The transistor 34, which may be considered to be of the N–P–N junction type, also includes a collector 36 and an emitter 38. It is, of course, to be understood that transistors of N type conductivity, such as P–N–P junction transistors, could also be used in the circuit. The transformer 30 includes a primary winding 31, which is connected with the horizontal amplifier 28, and a secondary winding 32, one terminal of which is connected through a resistor 42 to the base 40 of the horizontal output transistor 34. The resistor 42 is shunted by a capacitor 44 to form an RC self-bias network. The other terminal of the secondary winding 32 is connected directly with the emitter 38 of the output transistor 34. The collector 36 of the output transistor 34 is connected to a point of fixed reference potential such as chassis ground. Thus, a direct low thermal resistance path is provided between the collector or large area electrode of the transistor and the chassis and maximum heat transfer is provided. The transistor 34, it is to be noted, is operated as a common emitter-grounded collector amplifier.

The emitter 38 of the transistor 34 is connected to ground through the horizontal deflection yoke winding, which is illustrated as comprising a pair of coils 46 and 48 and a capacitor 51. The horizontal deflection coils 46 and 48 are shunted by a capacitor 50. The emitter 38 is also connected to one terminal of the primary winding 52 of a high voltage transformer 53. The transformer 53 also includes a secondary winding 54 one terminal of which is grounded and the other terminal of which is connected to the plate 56 of a high voltage rectifier 58. The high voltage rectifier 58 also includes a filament 60 which is connected with the kinescope 14 in the usual manner. Voltage pulses appearing across the transformer 53 during retrace intervals of the deflection cycle are thus rectified to provide the high direct ultor voltage for the kinescope, as is conventional.

The primary winding 52 of the high voltage transformer 53 is also connected through an inductive winding 62 of a parallel resonant harmonic trap circuit 64 to a direct current negative supply source (not shown). A series arrangement of a capacitor 65 and a risistor 66 is connected in parallel with the inductor 62. As was mentioned hereinbefore, the deflection circuit including the high voltage transformer contains leakage inductance and distributed capacitance which cause undesired harmonic transients. The harmonic trap circuit 64 provides absorption of the undesired harmonic transients. The energy absorbed by the harmonic circuit has also been found, in accordance with the invention, to be of the proper magnitude to heat the filament 60 of the high voltage rectifier 58. To this latter end, an auxiliary winding 68 is connected in inductive coupling relation to the inductive winding 62 of the harmonic trap circuit 64 for deriving harmonic energy therefrom. The auxiliary winding 68 is also connected with the filament 60 of the high voltage rectifier 58. It is to be noted that the resistor 66 is not necessary but may be used to dissipate a portion of the harmonic energy if an excessive amount of harmonic energy is available.

In operation, a television signal at radio frequency, which is received by the antenna 8, is amplified and demodulated by the television tuner and second detector 10 which would, as noted above, normally include a radio frequency amplifier, a frequency converter, an intermediate frequency amplifier, a detector and a video amplifier. The demodulated television signal appearing at the output lead 12 is then applied to the control grid of the kinescope 14. The demodulated television signal also is applied to the sync separator circuit 16, which separates the deflection synchronizing signals from the composite television signal and supplies vertical synchronizing signals to the vertical deflection circuit generator 16 and horizontal synchronizing signals to the phase detector 24. Output pulses generated by the vertical deflection generator 18 are supplied to the vertical deflection circuit 20 which, in turn, supplies a suitable sawtooth of current of field frequency through the vertical deflection winding 22 which is connected across the output terminals Y—Y of the vertical deflection output stage 20. As was explained hereinbefore, the signal generated by the horizontal oscillator 26 is applied to the phase detector 24. The phase of this signal is compared by the phase detector 24 with the phase of the horizontal synchronizing pulses which are applied to the phase detector 24 from the sync separator circuit 16. Thus, the phase detector develops an error voltage which is applied to the horizontal oscillator 26 and is used to control its frequency.

Horizontal output pulses, at a frequency controlled by the error voltage which is applied to the horizontal oscillator 26 from the phase detector 24, are applied to the horizontal amplifier 28. The amplified voltage pulses from the horizontal amplifier 28 are coupled through the transformer 30 and applied between the base and emitter electrodes of the horizontal output transistor 34.

The horizontal output transistor 34 is operated as a switch. During the trace portion of the horizontal deflection cycle, the transistor 34 is forward biased from the negative supply terminal and by the positive portion of the base input pulses, and current will flow from the collector 36 to the emitter 38 and from the emitter through the deflection coils 46 and 48 of the electron beam deflection yoke associated with the kinescope 14. The current through the coils will increase in a linear manner with the time until a pulse of negative polarity is applied to the base of the transistor from the horizontal amplifier 28. At this time, current in the emitter-collector circuit of the transistor 34 ceases and the energy stored in the deflection coils 46 and 48 discharges through the capacitor 50 in a half-wave oscillatory manner during the retrace portion of the horizontal deflection cycle. When the input pulse terminates, the forward bias condition is restored on the output transistor 34 and the circuit including the deflection windings and the transistor is closed. The operating cycle then repeats. Thus, the deflection arrangement, including the transistor 34, generates a saw tooth current wave for horizontally deflecting the electron beam of the kinescope 14.

As previously noted, the output transistor 34 acts as a switch. Since the deflection circuit including the high voltage transformer has a certain amount of unavoidable leakage inductance and distributed capacitance, the switching of the transistor from an on or conducting state to an off or non-conducting state produces current and voltage transients. These transients are of a harmonic frequency of the deflection frequency. These transients are superimposed on the deflection current and cause modulation of the kinescope raster. For this reason these transients are undesirable and should be eliminated.

The parallel harmonic resonant trap circuit 64 is tuned to the frequency of these transients and is thus excited by them. The energy absorbed by the harmonic trap circuit 64 is then coupled through the auxiliary winding 68 to the filament 60 of the high voltage rectifier 58 and provides the heater power therefor. Accordingly, the undesired harmonic ferquencies are eliminated from the deflection circuits and the energy due to the harmonic frequency transients is used in a beneficial manner, rather then being dissipated. Thus, the invention is particularly useful in transistor television receivers where power is at a premium.

In Figure 2, reference to which is now made, the horizontal output stage includes two transistors 72 and 80 which are connected in series for both alternating and direct currents. By using two transistors in series, higher voltages may be employed in the operation of the circuit. Each of the transistors 72 and 80 may be considered to be of the N–P–N junction type. The transistor 72 includes an emitter 74, a collector 76 and a base 78. The transistor 80 includes an emitter 82, a collector 84 and a base 86. To supply input driving signals to the transistors, such as from output terminals *a—a* of the horizontal amplifier 28 of Figure 1, a transformer 88 is provided, which includes a primary winding 89 connected to terminals *a—a* and a pair of secondary windings 90 and 91. One terminal of the first secondary winding 90 is connected through a resistor 92 to the base 78 of the transistor 72. A capacitor 93 is connected in shunt with the resistor 92 to form an RC self-bias network. The other terminal of the secondary winding 90 is connected directly with the emitter 74 of the transistor 72. The other secondary winding 91 is connected in a similar manner. That is, one terminal of the secondary winding 91 is connected through an RC bias network comprising the parallel combination of a resistor 94 and a capacitor 95 to the base 86, while the other terminal of the secondary winding 91 is connected directly with the emitter 82 of that transistor. Thus, input signals are applied in parallel to the transistors 72 and 80. To provide the series direct current path the collector 84 of the transistor 80 is connected directly to chassis ground while the emitter 82 of this transistor is connected directly with the collector 76 of the transistor 72.

The emitter of this latter transistor is connected through a pair of unilateral conducting devices such as semiconductor diodes 96 and 98, which are connected in parallel, to ground. The diodes 96 and 98 are poled for forward conduction in the same direction as reverse emitter-collector current of the transistors 72 and 80. The diodes 96 and 98 insure and improve symmetrical operation of the output transistors and may improve their response time. The diodes 96 and 98 are particularly desirable if transistors having the desired symmetry are not available. The emitter 74 of the transistor 72 is also connected through the horizontal winding of the deflection yoke, which includes the coils 46 and 48 connected in parallel and a capacitor 102 to ground. The capacitor prevents direct current flow through the deflection windings and improves the linearity of the deflection angle. A pair of capacitors 100 and 101 are connected in parallel with the horizontal deflection yoke winding.

A high voltage transformer 104 is provided in the circuit of Figure 2 and includes two primary windings 105 and 106 and four secondary windings 107, 108, 109 and 110. To provide forward bias for the transistor 72 the emitter 74 thereof is connected through the primary windings 106 and 105 to a negative source of direct current operating potential (not shown). To insure proper voltage division between the transistors 72 and 80, a capacitor 112 is connected from the junction or center tap point of the primary windings 105 and 106 to the junction of the emitter 82 of the output transistor 80 and the collector 76 of the output transistor 72. This connection provides equal division of signal voltage between the transistors as the output voltage swings across the primary circuit of the high voltage transformer.

In accordance with the invention, the harmonic tuned trap circuit 64 is connected between the secondary windings 108 and 109 of the high voltage transformer. It has been found that the maximum amount of harmonic energy is present at the approximate center of the high voltage primary. Accordingly, the elemination of the undesired harmonic transients is optimized if the harmonic circuit 64 is connected between the windings 108 and 109 and these windings are selected to have a substantially equal number of turns. It has also been found, however, in accordance with the invention, that the harmonic transients may be substantially reduced, as an alternative, by connecting the harmonic trap circuit in the primary side of the high-voltage transformer, as in Figure 1, or, as another alternative, by connecting the trap circuit between the secondary winding 109 and ground. Preferably, however, the harmonic trap circuit 64 will be connected as shown in Figure 2. The energy absorbed by the harmonic circuit 64 is used, according to the invention, to supply the heater power for the high voltage rectifier 58. Thus, as in Figure 1, an auxiliary winding 68 is provided in inductive coupling relation with the inductor 62 and is connected with the filament 60 of the high voltage rectifier 58.

The secondary windings 107 and 110 of the high voltage transformer 104 are used to derive voltage pulses from across the primary circuit of the high voltage transformer. These pulses are rectified by a power supply circuit 111 which includes a pair of diode rectifiers 113 and 114. The rectified voltage may be used to supply the voltage for the focus electrodes (not shown) of the kinescope 14. This voltage may be derived from a tap 115 of the circuit 111. A negative voltage may also be derived from a lead 116 of the circuit 111 and used as the bias supply voltage for the video amplifier (not shown) of the receiver. A third voltage may be derived from a lead 118 of the circuit 111 and used as the energizing voltage for the control grid (not shown) of the kinescope 14. Finally, a fourth voltage which is derived from a lead 119 of the circuit 111, may be integrated by a high resistance integrating network (not shown) to provide a sawtooth voltage wave for comparison with the horizontal sync pulses to provide an error voltage for phase control of the horizontal oscillator such as the oscillator 26 of Figure 1.

In operation, the circuit of Figure 2 operates in a manner similar to the circuit of Figure 1 and is effective, through the novel circuitry disclosed, to reduce undesired harmonic transients and to provide heater energy for the high voltage rectifier of the receiver.

A circuit has been built and tested using the following circuit specifications. With these specifications the harmonic trap circuit 64 is tuned to a frequency of 200 kilocycles which is approximately the thirteenth harmonic of the horizontal frequency.

| | |
|---|---|
| Transistors **72** and **80** | RCA type SX169. |
| Diodes **96** and **98** | Type 1N91. |
| Horizontal yoke (windings **46** and **48**) | 73 microhenries. |
| Capacitors **100**, **101** and **102** | 0.1, 0.01 and 8 microfarads, respectively. |
| Inductor **62** | 775 turns—8 millihenries. |
| Inductor **68** | 9 turns. |
| Resistor **66** | 12,000 ohms. |
| Capacitor **65** | 47 micro-microfarads. |

Circuits embodying the invention effectively eliminate harmonic transients from the deflection circuits of transistor television receivers. In addition, the harmonic energy is used to supply the heater power for the high voltage rectifier of the receiver. Thus, improved performance and the efficient use of the available power characterize circuits embodying this invention.

What is claimed is:

1. In a television receiving system the combination with a high voltage transformer and a high voltage rectifier having a heater electrode, of a harmonic frequency trap circuit connected with said transformer for minimizing undesired harmonic transients, means for deriving harmonic energy from said trap circuit, and means for applying said harmonic energy to said high voltage rectifier to provide heater energy therefor.

2. In a transistor television receiving system the combination with a transistor horizontal deflection circuit, a high voltage transformer circuit connected with said deflection circuit, and a high voltage rectifier including a filament coupled with said transformer for obtaining a kinescope ultor voltage, of a resonant circuit tuned to the frequency of undesired voltage and current transients connected in said high voltage transformer circuit, means for deriving energy from said resonant circuit, and means for applying said energy to said high voltage rectifier to heat said filament.

3. In a television receiving system the combination as defined in claim 2 wherein said high voltage transformer circuit includes a primary and a secondary circuit and said resonant circuit is connected in said primary circuit.

4. In a television receiving system the combination as defined in claim 2 wherein said high voltage transformer circuit includes a primary and a secondary circuit and said resonant circuit is connected in said secondary circuit.

5. In a television receiving system including a kinescope having a horizontal deflection winding the combination comprising, a transistor horizontal deflection output stage connected with said deflection winding and operative to provide deflection current flow therethrough, a high voltage transformer including a primary winding and a secondary winding, means connecting said transistor with said primary winding, a high voltage rectifier including a plate and a filament, means connecting said secondary winding with the plate of said rectifier, means connecting said filament with said kinescope for applying a high ultor voltage thereto, a resonant circuit tuned to undesired harmonic frequencies connected in series with said secondary winding for absorbing harmonic energy, means including an auxiliary winding coupled with said resonant circuit for deriving said harmonic energy therefrom, and means connecting said auxiliary winding with the filament of said high voltage rectifier for applying said harmonic energy thereto.

6. In a television receiver the combination defined in claim 5 wherein said secondary winding comprises a first and a second section having a substantially equal number of turns and wherein said resonant circuit is serially connected between said first and second sections.

7. In a television receiving system, a horizontal deflection circuit, a high voltage transformer circuit connected with said deflection circuit, a high voltage heater type rectifier coupled with said transformer, a trap circuit tuned to the frequency of undesired harmonic signals connected in said high voltage transformer circuit, means for deriving energy from said trap circuit, and means for heating said rectifier including means for applying said energy thereto.

8. In a television receiving system including a kinescope having a horizontal deflection winding the combination comprising, a transistor horizontal deflection output amplifier having an input electrode and an output electrode, said output electrode being connected with said deflection winding to provide deflection current flow therethrough in response to the application of input pulses to said input electrode, a high voltage transformer including a primary winding and a secondary winding, means connecting the output electrode of said transistor with said primary winding, a high voltage rectifier including a plate and a filament, means connecting said secondary winding with the plate of said rectifier, means connecting said filament with said kinescope for applying a high voltage thereto, a resonant circuit tuned to undesired harmonic frequencies connected with said transformer for absorbing harmonic frequency energy, means coupled with said resonant circuit for deriving harmonic frequency energy therefrom, and means for heating the filament of said rectifier comprising a coupling circuit for applying said harmonic energy to said filament.

9. In a television receiving system the combination with a deflection circuit and a heater type high voltage rectifier, of means for minimizing harmonic transients in said deflection circuit including a harmonic frequency trap circuit connected in said deflection circuit, and means for supplying heater energy to said high voltage rectifier from said trap circuit.

10. In a television receiving system including a kinescope having a horizontal deflection winding the combination comprising, a transistor horizontal deflection output stage connected with said deflection winding and operative to provide deflection current flow therethrough, a high voltage transformer including a primary winding and a secondary winding, means connecting said transistor with said primary winding, a high voltage rectifier including a plate and a filament, means connecting said secondary winding with the plate of said rectifier, means connecting said filament with said kinescope for applying a high ultor voltage thereto, a resonant circuit tuned to undesired harmonic frequencies connected in series with said primary winding for absorbing harmonic frequency energy, means including an auxiliary winding coupled with said resonant circuit for deriving harmonic frequency energy therefrom, and means connecting said auxiliary winding with the filament of said high voltage rectifier for applying said harmonic frequency energy thereto as the sole source of filament heater current therefor.

11. In a television receiving system the combination with a high voltage transformer connected in a deflection circuit of said system and a heater type high voltage rectifier coupled with said transformer for providing a high ultor voltage in response to deflection voltages, of a harmonic frequency trap circuit connected with said transformer for minimizing undesired harmonic transients, means for deriving harmonic energy from said trap circuit, and means for applying said harmonic energy to said high voltage rectifier heater.

References Cited in the file of this patent

UNITED STATES PATENTS

| | | |
|---|---|---|
| 2,253,381 | Lee | Aug. 19, 1941 |
| 2,559,078 | Kell | July 3, 1951 |
| 2,694,177 | Sola | Nov. 9, 1954 |